(12) United States Patent
Weinmann et al.

(10) Patent No.: US 6,796,783 B1
(45) Date of Patent: Sep. 28, 2004

(54) MOLD CLOSING UNIT (75) Inventors: Robert Weinmann, Weesen (CH);
Bruno Stillhard, St. Gallen (CH);
Ralph Keitel, Algolsheim (FR)

(73) Assignee: Netsal Maschinen AG, Nafels (CH)

( * ) Notice: Subject to any disclaimer, the term of this patent is extended or adjusted under 35 U.S.C. 154(b) by 0 days.

(21) Appl. No.: 09/913,047

(22) PCT Filed: Feb. 9, 2000

(86) PCT No.: PCT/CH00/00069

§ 371 (c)(1),
(2), (4) Date: Nov. 14, 2001

(87) PCT Pub. No.: WO00/47389

PCT Pub. Date: Aug. 17, 2000

(30) Foreign Application Priority Data

Feb. 10, 1999 (CH) .............................................. 249/99

(51) Int. Cl.[7] .............................................. B29C 45/64
(52) U.S. Cl. ..................... 425/190; 425/589; 425/451.4
(58) Field of Search .............................. 425/190, 589, 425/595, 451.4

(56) References Cited

U.S. PATENT DOCUMENTS

| | | | | |
|---|---|---|---|---|
| 5,069,613 A | * | 12/1991 | Inaba et al. | 425/589 |
| 5,622,737 A | * | 4/1997 | Hehl | 425/589 |
| 5,843,496 A | * | 12/1998 | Ito et al. | 425/589 |
| 5,863,474 A | * | 1/1999 | Ito et al. | 425/595 |
| 5,916,604 A | * | 6/1999 | Oshiro et al. | 425/190 |
| 6,010,324 A | * | 1/2000 | Oshiro et al. | 425/595 |

FOREIGN PATENT DOCUMENTS

| | | |
|---|---|---|
| DE | 12 27 642 | 10/1966 |
| DE | 93 12 232 | 10/1993 |
| EP | 0 213 211 A1 | 3/1987 |
| EP | 0 366 810 A1 | 5/1990 |

OTHER PUBLICATIONS

English language Abstract of JP Publication No. 09 225980, Patent Abstracts of Japan, vol. 1998, No. 1, published Sep. 2, 1997.

English language Abstract of JP Publication No. 01 249410, Patent Abstracts of Japan, vol. 13, No. 593, published Oct. 1989.

\* cited by examiner

*Primary Examiner*—James P. Mackey
(74) *Attorney, Agent, or Firm*—Finnegan, Henderson, Farabow, Garrett & Dunner, L.L.P.

(57) ABSTRACT

The novel solution provides a closing part comprising an electromechanical drive for a CD injection molding machine having a working stroke and a servicing stroke. The entire mold closing unit is characterized by the combination of a short-stroke crank mechanism which is operated by an electric motor and which is provided for the working stroke and of a central electromotive column-type nut drive for the servicing stroke. According to the invention, synchronous motors or asynchronous motors are used with corresponding servo boosters to realize servo axles. The central column drive is used as a control element of the closing force control, together with a force sensor for detecting the closing force, as an actual value transmitter and as a control device.

28 Claims, 10 Drawing Sheets

MOLD CLOSING UNIT

TECHNICAL FIELD

This invention relates to a mold closing unit for an injection molding machine having a short working stroke and a longer servicing stroke, especially for production of disc-shaped parts.

STATE OF THE ART

In injection molding of flat parts such as compact discs, the opening Stoke for the production cycle of the injection molding machine should be kept only as large as necessary for unmolding. Such compact discs are a few millimeters thick. Thus, theoretically, an opening slightly larger than 1 cm would be sufficient. Recent trends have in fact been toward short strokes of 30 to 50 mm to minimize the so called dry run time. In changing molds, however the opening width must be increased relatively rapidly up to approx. 300 mm. This operation is known as a servicing stroke.

The data carriers known today as CDs have gained a key position in the economy and in also in the private sector that can no longer be overlooked. Digitized storage of data plus audio and video has set completely new standards. There are already known CDs which have a very high data density as well as new multilayer technologies with up to two information layers. MO (magnetic optical), CD-R (writable once, for photos, computer data, music/video recordings), CD-RW (multiply writable, for computer data and music recordings, video sequences), music CDs and CD-ROM. The constant increase in date volume and the associated data compression as well as the data storage technologies developed along with them demand ever greater precision, reproducibility and long-term stability iii the molding operations. This in turn makes maximum demands of the control rule accuracy of speeds, pressures, forces and temperatures for production of such data carrier discs by inject on molding. The constancy, especially in the technical process parameters listed above, deter nines the quality of the discs and has a significant influence on the profitability of the overall system of production installations. A modern production shop for mass production of CDs will include several production units, with a larger unit being able to achieve a production au put of up to 10,000 discs in 24 hours. Not only is the success of such production determined by the highest demands of the casting system as Such, but also it requires a precision interaction of the most important subsystems with respect to all the functions and quality features, primarily in involving the machine, the molds and handling as well as the removing device, delivery, etc. The highest possible reproducibility is demanded along with precision shaping of the pits and excellent long-term process stability with extremely short cycle times. A larger factory will frequently also have its own recording studios, a modern mastering infrastructure and several replication lines and will produce, for example, 60 million optical discs per year or 220,000 discs per day.

The enormous production figures listed here for just one factory necessitate a high degree of specialization. Although the market demands CDs with various basic structures, unlimited variation is required with respect to the specific data to be recorded on the CDs. Individual series are usually small, but they may amount to only a few thousand or tens of thousands. The result is unusually rapid changing of the mold inserts for injection molding machines. Under some circumstances, a mold or the corresponding stammer may be in the machine for only a quarter hour or a half hour, and then it must be replaced by another. In addition to error-free production, profitability involves mainly two factors which are almost equally important:

1. The cycle time for one CD including the required dry run time,
2. Setup time for insertion of the die (stamper) into the base mold for changing information.

The set-up time with series, which are usually small, has a great effect on productivity because stampers must often be changed several times an hour. The extreme requirements presented here are met very successfully today with fully hydraulic injection molding machines. Instead of the classical negative mold, so-called stampers are used for CD production. When seen from a distanco, stampers are a type of thin CD having the image of the surface structure of the CD as a negative mold. Thus, only the stamper plate is changed; it can be inserted into the mold and removed again in half a minute, for example. One advantage of electromechanical injection molding machines in comparison with hydraulic drives is that they have better utilization of the driving energy and sometimes even allow a higher precision for parts production. Another advantage of electric drives in addition to their low noise is that they do not use any oil hydraulics which are known to use high pressures, so this avoids any risk of soiling due to leakage of oil. Electromechanically operated injection molding machines must rely on force translating systems such as ball spindles, toothed racks, lever systems is, etc. for generating the closing force: such systems, such as a double-toggle system, increase the force on the crosshead or articulated head by a factor of 24 to 50, for example, in order to generate the closing force. However, today's electromechanical injection molding machines having a toggle system are not suitable for short working strokes, because then lubrication of the hinge pins is no longer guaranteed. When working with fully hydraulic injection molding machines, however, a stroke distance of 70 mm is consisted with the state of the art.

EXPLANATION OF THE INVENTION

The object of this invention is to develop a short stroke/long-stroke combination which will allow the greatest possible productivity and the highes: quality as well as the shortest possible dry run time for production of flat parts. Another goal is to develop a machine with the most compact possible design using one, two or more cavities, in particular also for use in a clean room.

This object is achieved according to this invention by the fact that it has a drive carrier plate having at least one electric motor servo axle, where the drive carrier plate can be connected to the machine stand of the injection molding machine in a stationary position at the end or it may move relative to the mold backing plate on the nozzle end.

The inventors have recognized that optimum use of electromechanical driving means, especially with regard to suitability for use in a clean room, can be guaranteed in particular if they are defined locally starting from a drive carrier plate instead of dividing the drive means between two carrier plates, as is the case currently with the most successful hydraulic CD machine.

This new solution permits some entirely now designs for both the short stroke or the working stroke and the long stroke or servicing stroke. A first embodiment is characterized in that it has an electric motor crank mechanism, preferably with a servo motor for the short stroke, by means of which a movable mold backing plate can be opened and closed quickly for the working stroke. The crank mechanism has an eccentric shaft and preferably two crank levers arranged in parallel, driven by a synchronous or asynchronous motor and acting symmetrically on the movable mold plate. The movable mold backing plate and the crank mechanism thus form a compact module anchored on the drive carrier plate, with the movable mold backing plate being guided on a guide. The enormous advantage achieved with a compact module consisting of the movable mold backing plate together with the crank mechanism is to be seen first of all in the production of an entire machine. The module permits economical modular assembly. If all the elements within one module are manufactured and fitted with the highest precision, this yields the highest precision for the overall functioning as well, despite the very short assembly time, because it can be based on the internal precision of the module. The crank mechanism can be utilized optimally in the crank function, as a pure impact function at the maximum required closing force by means of an eccentric shaft, and in the corresponding dead center range, the crank can be used for 100% unloading of the driving means or their bearings before this range. The greatest possible forces from the standpoint of mold closing can be reduced to purely static supporting forces which are more easily controlled per se. A not insignificant advantage is derived from the fact that not only any desired slot working strokes can be used, but also the short stroke is kept at least approximately in the dead center position when the crank mechanism is in the closed position. For the open position, however, it can be stopped in any desired position outside the dead center position to shorten and optimize the dry run time. To ensure the greatest possible closing force or the largest possible closed positions, the crank mechanism always moves at least approximately into a fixed preselected optimum position. Variations in mold thickness such as those due to temperature, for example, are adjusted by correcting the position of the mold backing plate on the nozzle end.

According to a second embodiment of this invention, the mold closing unit is characterized in that it has an electric motor column-type nut drive for the servicing stroke by means of which a mold backing plate on the nozzle end can be moved relative to the drive carrier plate for the servicing stroke. It is especially preferable here for the columns themselves to be drivable and for the mold backing plate on the nozzle end with the nuts mounted on it to be designed to be movable. Thus, the drive carrier plate becomes what is indicated by the phrase to the full sense of the term. The corresponding end plate becomes a carrier for the drives and is preferably fixedly connected to the machine stand. This brings several advantages at once. The static forces can be closed in the shortest distance. The highly dynamic forces are diverted or controlled from only one side, namely only from the drive carrier plate. In this way, possible vibrational processes can be kept under control more easily or compensated, while access can be ensured at the same time, even for corrections.

The rotational drive for all columns takes place centrally, preferably by means of a toothed belt drive or a rim gear. It is also proposed that the central column-type nut drive should be designed as a final controlling element of the closing force regulation together with a force sensor arranged on a machine part as an actual value generator for detection of the closing force and a control device. Position detection of the stroke movement takes place advantageously by means of position detection in the servo motors themselves. These reproducible positions are used by the control/regulation and coordination of the various axles, e.g., also for control/regulation and synchronization of the actuation of the removing device and the mold closing axle. The control/regulation device is designed as a central adjustment for the servicing stroke and the working stroke with the required memories for storing formulations and programs. The control/regulation device is equipped for precise, coordinated control/regulation of the servo axles for the short stroke as well as the long stroke and with corresponding servo boosters for synchronous or asynchronous motors. It is important here that it has at least one independently controllable drive motor, preferably a servo motor for the working stroke and the servicing stroke. In the normal case, both drive sides are designed electromechanically for the working stroke and for the servicing stroke, with the direction of impact of the crank mechanism being arranged at least approximately symmetrically inside the column axles. The movable mold backing plate and the mold backing plate on the nozzle end are guided on a common guide. The column-type nut drive has at least three driven columns, preferably four, with the overdrive for the three or four columns being arranged on the outer end of the drive carrier plate and the overdrive for the crank mechanism being arranged on the inner end of the drive carrier plate.

In a modification of the possible embodiments described above, the mold plates, e.g., also the short-stroke carrier plate and the long-stroke carrier plate, may each be designed as selectable fixed mold plates or movable mold plates for very specific applications, with a nut drive having a central axial drive again being provided here for the relative movement of the plates. All the movement functions are primarily movements of the components relative to one another and only secondarily are they movements of the components relative to the stationary machine stand. For example, if the long-stroke carrier plate is fixedly anchored on the machine stand, the movement functions of the injection end must be adapted and coordinated accordingly.

BRIEF DESCRIPTION OF THE INVENTION

This novel solution will now be illustrated on the basis of a few embodiments with additional details, showing:

FIG. 8b a view according to arrow IIX in FIG. 8a;

FIG. 9 a section IX—IX in FIG. 6a;

METHOD OF THE EMBODIMENT OF THE INVENTION

This novel solution makes it possible to design an entire machine for use in a clean room and to combine the advantages of machines equipped with a toggle system as well as those of machines equipped with fully hydraulic mold closing. An important advantage of the novel solution is that the dry run time can be designed to be extremely short, e.g., less than 0.3 second. In addition, even in the servicing stroke, movement with an accuracy in the micrometer range (thousandths of a millimeter) is guaranteed, so that the reproducibility of the closing movement operation, once it has been set, is fully guaranteed. The crank mechanism or eccentric drive also has the enormous advantage that the working stroke can be as small as desired, e.g., a crank radius of approx. 25–35 mm can be achieved easily.

Figure 1:
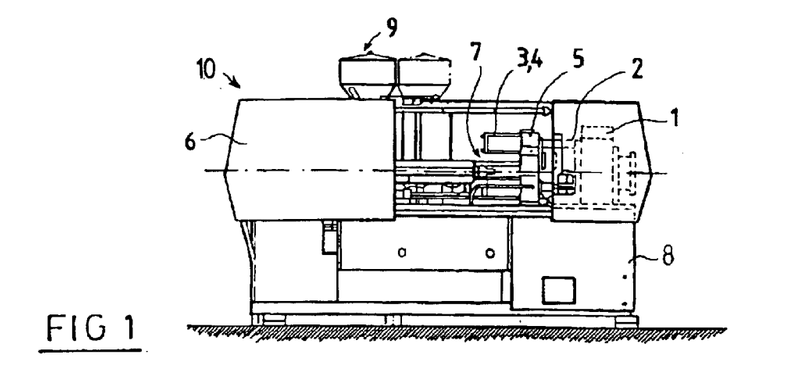
FIG. 1 an overall view of one solution according to the state of the art, specialized for production of compact discs (CDs)

With the solution according to FIG. 1, a CD can be produced in 3.7 seconds or less with the known state of the art. The known solution by the present applicant is a fully hydraulic machine 10 having very good properties with respect to machine stability, and it has three columns. The short stroke is 70 to 80 mm and the closing force is approx. 600 kN. The servicing stroke is a total of about 300 mm. Mold plate 1 is fixedly connected to a machine stand 8. Tension rods 2 are bolted to the mold plate 1, with a piston head 3 being arranged inside a cylinder 4 on the other end of the tension rod 2. The mold plate 5 is shown in a production position, with the piston head 3 constantly pressing against a shoulder or the tension rod 2. The force applied exceeds the closing force. With a relatively low force, a closing piston moves forward and in reverse by means of two auxiliary cylinders over the entire short stroke. The corresponding oil pressure is applied in a piston chamber only for application of the large closing force. For changing a stamper in the mold, the three cylinders are driven on the tension rods, and the mold plate 5 opens to the extent of the servicing stroke. The machine 10 is shown with the safety door 6 opened, with a view of the mold closure and the injection cylinder 7. The raw material is supplied through filling tank 9.

Figure 2:
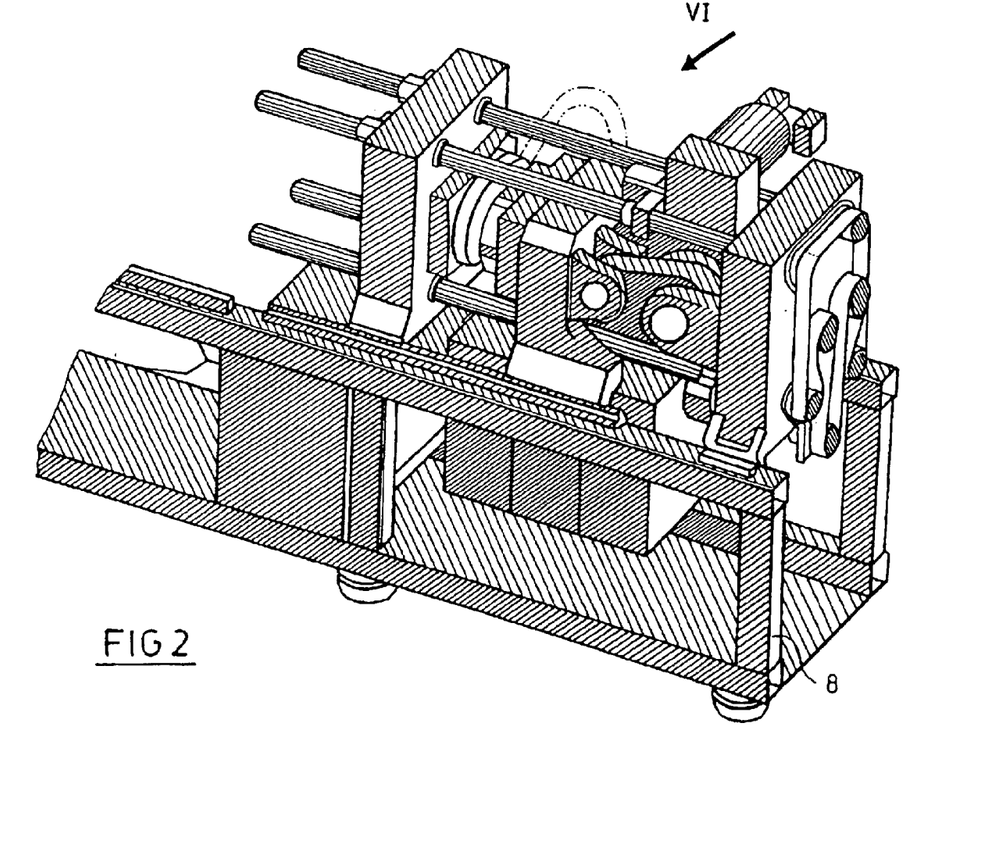
FIG. 2 an example of a novel solution in a perspective diagram.
Figure 3:
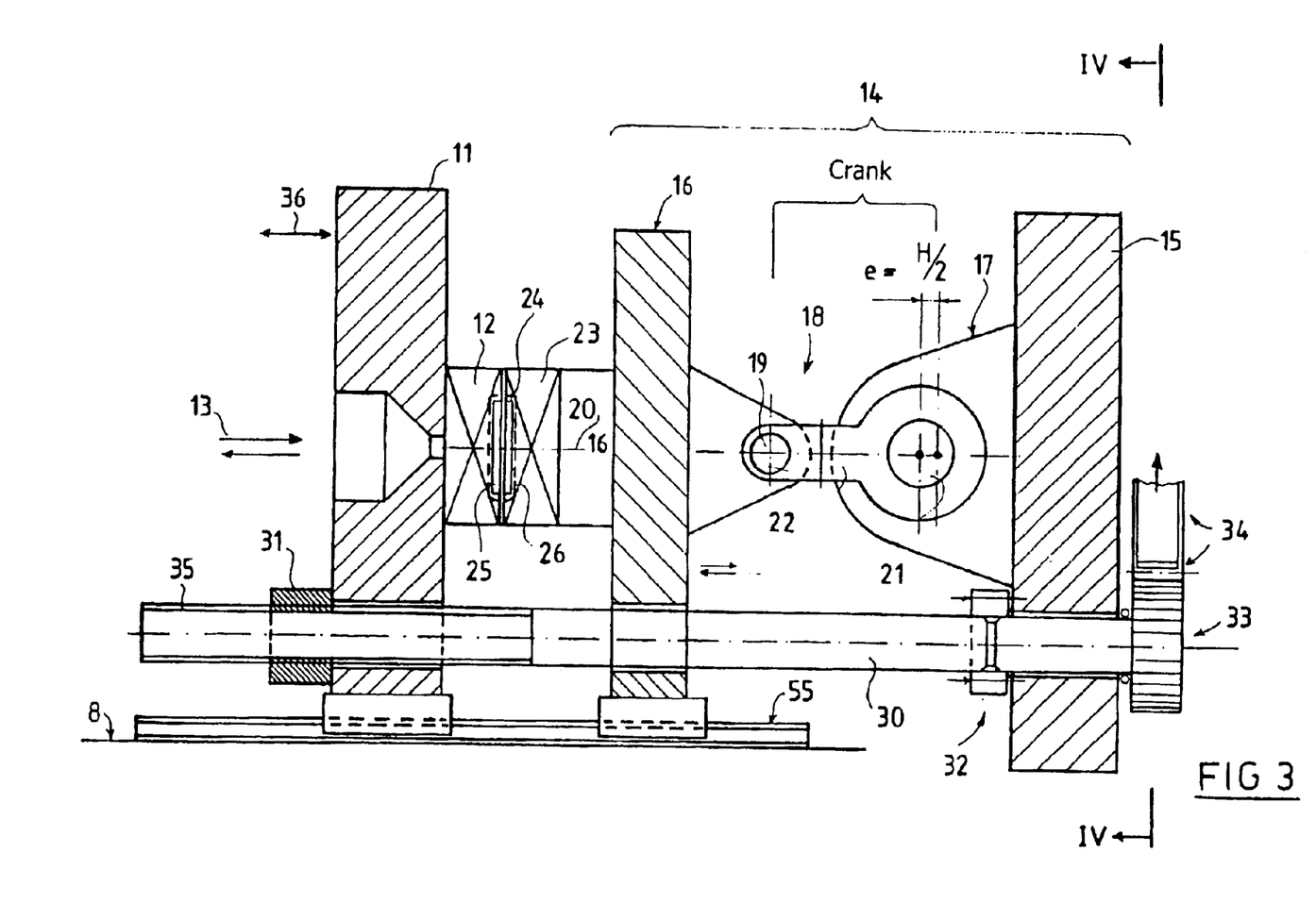
FIG. 3 the main elements of a short-stroke drive as another embodiment.
Figure 4:
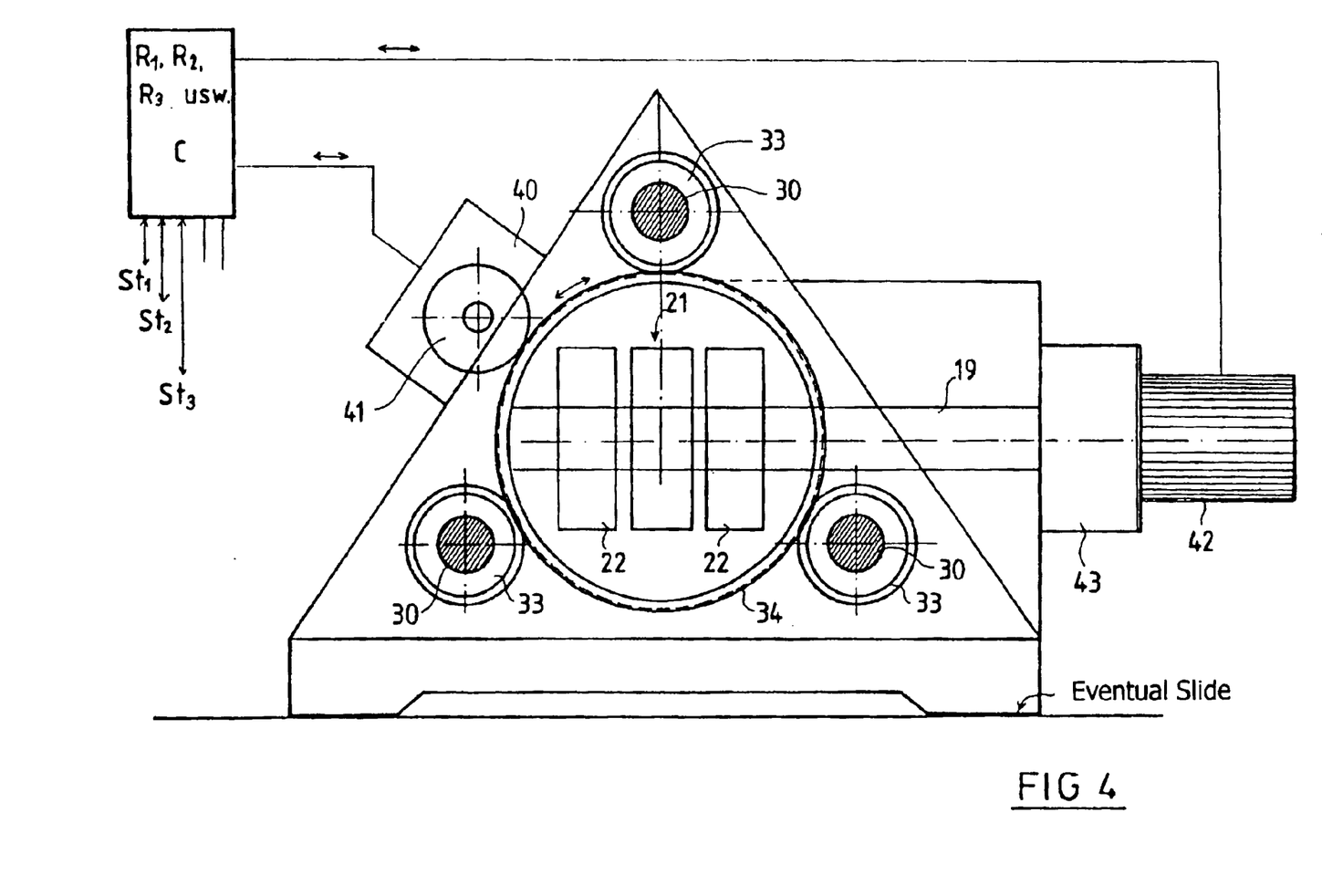
FIG. 4 a schematic diagram of a sectional view of a three-column machine along line IV—IV in FIG. 3.

FIG. 2 shows a perspective view of an example of the novel solution having four columns driven by toothed belts. FIGS. 3 and 4 show another example of the novel solution having three columns. On the left side of the figure can be seen the mold backing plate on the nozzle end or the long-stroke carrier plate 11 with one mold half 12 toward which the injection nozzle moves back and forth according to arrows 13. The long-stroke carrier plate 11 may be in a stationary mount or it may be arranged movably on the machine stand 8, depending on the design selected. The right side of the figure shows, for example, a crank mechanism as a compact modular unit 14. Modular unit 14 consists of a drive carrier plate 15 and a movable mold backing plate 16 which rests on the machine bed 8 on a guide 55 and a crank carrier structure 17. A crank mechanism 18 is mounted in an articulated manner on one end by a bolt 19 and the movable mold backing plate 16 and on the other end by a cam 21 in the crank carrier construction 17 in such a way that the crank 22 can execute the crank movement in accordance with an eccentricity e. Eccentricity e corresponds to half the stroke height (H/2). On the opposite end of the movable mold backing plate 16 is one mold half 23. Cavity 24 for insertion of the desired disc-shaped part is formed when the two mold halves 12 and 23 are closed. Usually, however, the CD is not cast directly in cavity 24 but instead a stamper 25, 26 having the negative mold for the CD is inserted into the cavity on one or both sides.

The movement of the mold half 12 relative to the carrier plate 15 essentially corresponds to what is known in the state of the art. The anchoring and holding force between the two plates is ensured by three columns (i.e., screws) (FIG. 4) or optionally four columns (i.e., screws) 30 according to FIG. 2. Each column 30 is anchored on the mold backing plate 11 on the nozzle end by means of a nut 31. A rotationally movable collar 32 is secured on the drive carrier plate 15 and engages by means of a rim gear 33 in a toothed ring 34 (FIG. 4). The fixed nut 31 engages with the thread 35 on each column (i.e., screw) by means of an inside thread. A rotational movement of the rim gear or the toothed belt is converted by the rotation of the columns on nut 31 and thread 35 of the columns into a linear movement (arrows 36) of the mold backing plate 11 on the nozzle end. This movement represents the long stroke or servicing stroke and is needed primarily changing stampers quickly. The short working stroke, however, is executed by the crank mechanism 18 and the movable mold backing plate 16. FIG. 4 shows schematically the drive or overdrive for the column nuts and the long stroke with electric motor 40 having drive pinion 41 and the drive for the short stroke by means of an electric motor 42, a gear 43 and cam 21. The injection unit and the plastifying cylinder are assigned to the mold backing plate 11 on the nozzle end, and both electric motor drives are assigned to the other fixed carrier plate. The servicing stroke is operated with an essentially known "mold structural height adjustment" by means of a rim gear and gear wheels on the column nuts. As an alternative, the rotation of the columns can be implemented with a toothed belt. Higher adjustment rates and thus set-up times of less than 30 seconds can be achieved when changing the dies (stampers) due to the mounting of the columns with roller bearings in the mold plates and lubrication of the bearings and the adjusting thread. Therefore, it is also novel that an accurately positionable electric motor, preferably a servo motor with a gear with a low play, is also used for this drive. Between the crank mechanism and the electric drive motor, there is a gear, preferably a spur gear. C indicates a control/regulation intelligence with a memory which selects the required program sequences or formulations for the corresponding motor control/regulation. R1, R2, R3, etc. in box C indicate that any desired computation power can be installed directly on-site and corresponding coordinations can be carried out directly. Accordingly, the control connections St1, St2, St3 may be provided, and a corresponding optimization of all control and regulatory sequences can be ensured.

Figure 5A:
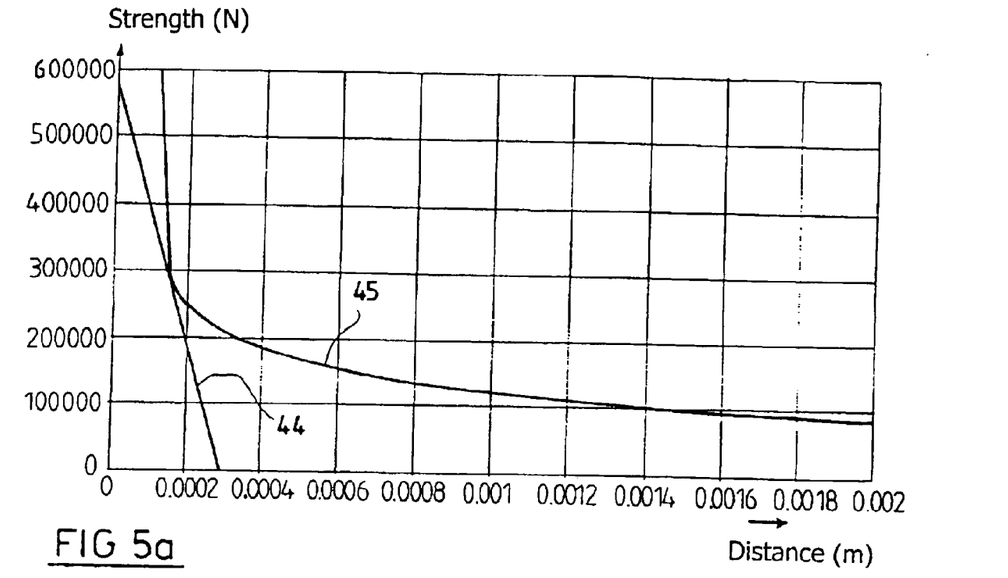
FIG. 5a the theoretical force diagram at the end of the closing movement and in the buildup of the closing force.
Figure 5B:
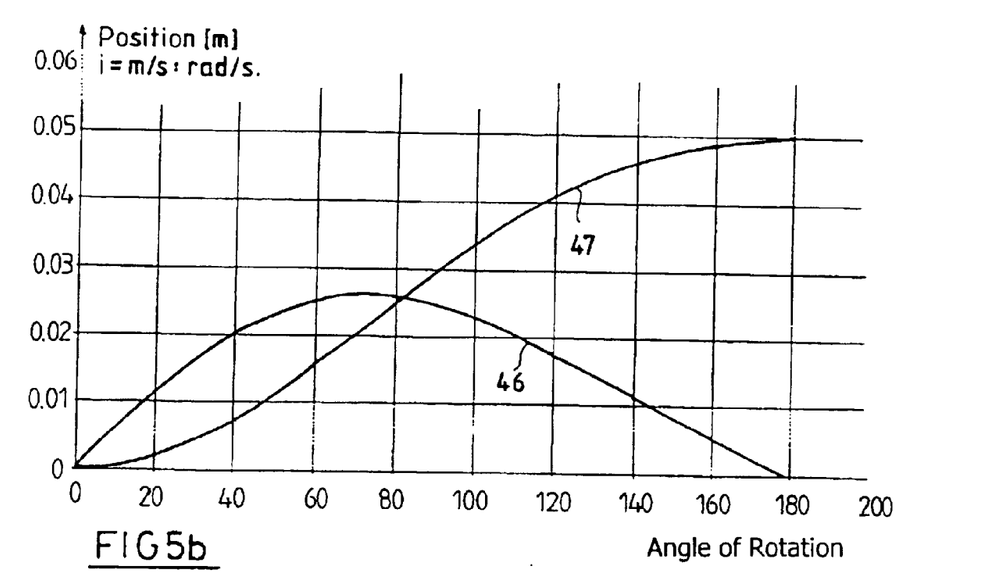
FIG. 5b function of position and angle of rotation for the crank mechanism.

Solid line 45 in FIG. 5a shows the theoretical force curve at the end of the closing movement. The bold line 44 shows the effective force curve on both halves of the mold on the basis of Hook's characteristic lines of deformation of the columns and plates in the case of a CD closing unit with a 50 mm opening distance. The lower line 46 in FIG. 5b shows the rate curve, and line 47 shows the path of movement of the cam for a CD mold closure.

Figure 6A:
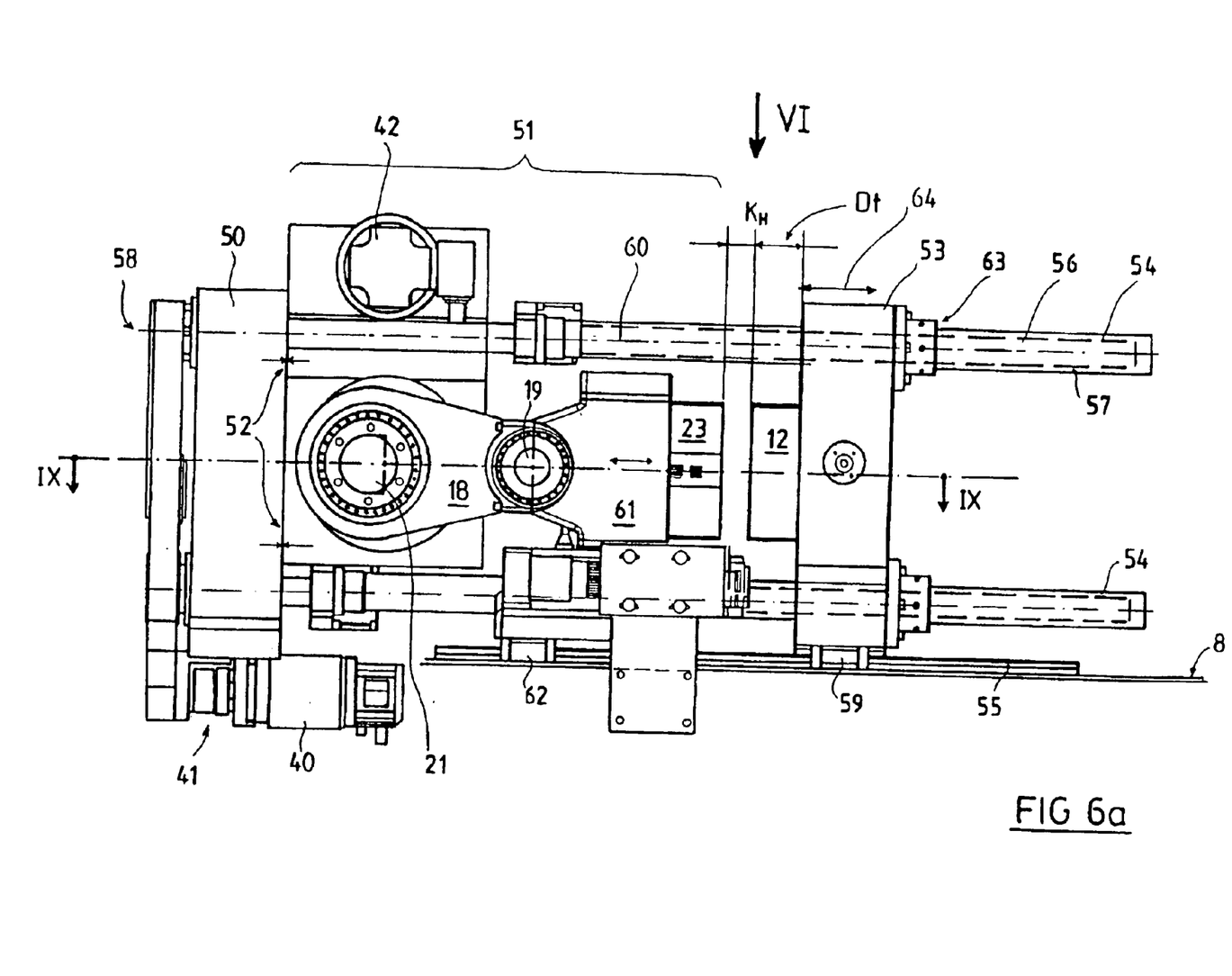
FIG. 6a a view of FIG. 2 from the rear according to arrow VI.
Figure 6B:
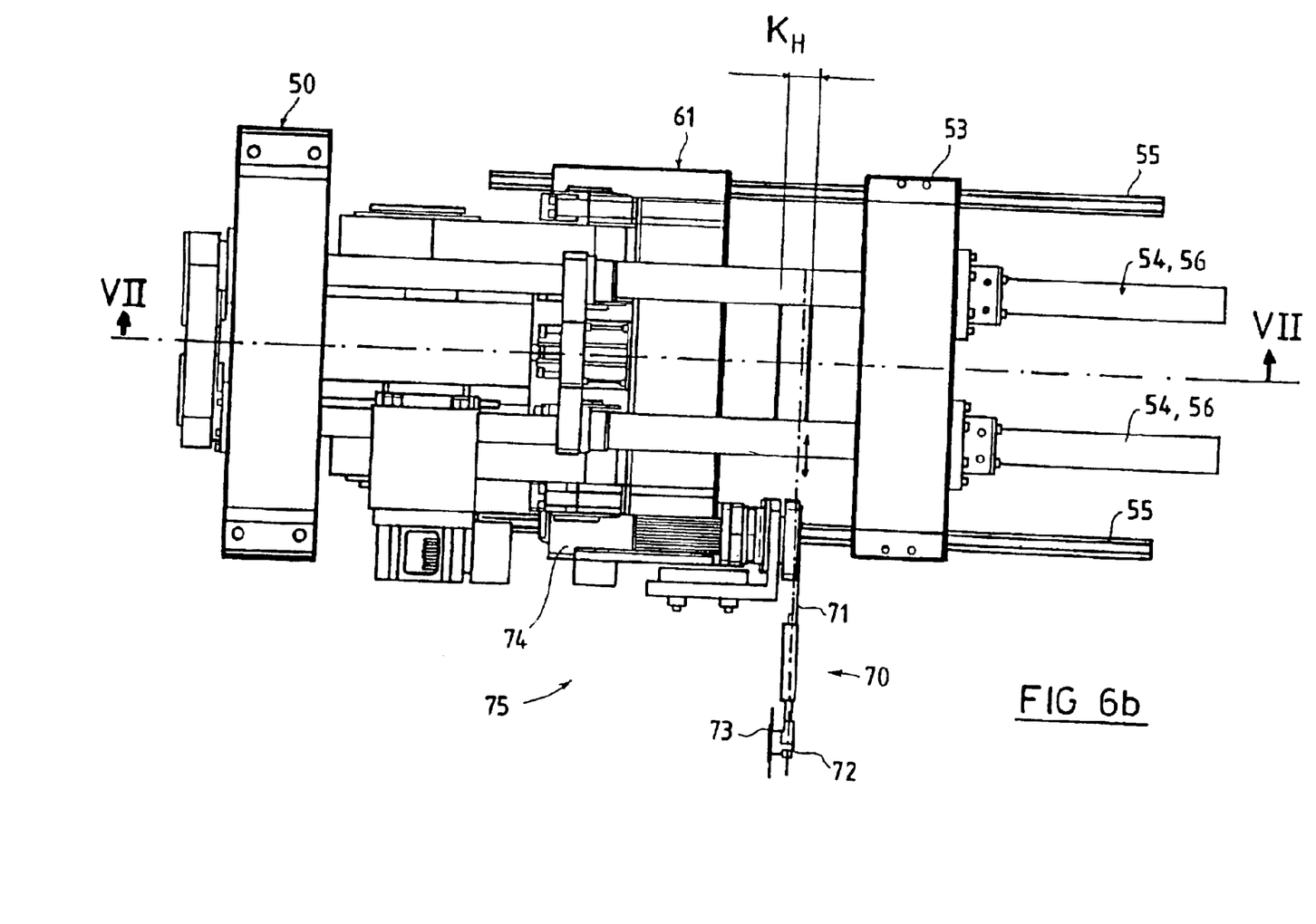
FIG. 6b a view of from above in FIG. 6a according to arrow VI.

Reference is made to FIGS. 6a and 6b below, showing a view from the side and from above (FIG. 6b). At the left side of the figure can be seen a drive carrier plate 50 with a module 51 for the working stroke of short stroke bolted tightly to it directly by connecting means 52 on the right. A mold backing plate 53 on the nozzle end is shown in the right half of the figure. The mold backing plate on the nozzle end is held by four columns 54 with respect to the drive carrier plate 50 and is guided at the lower end on a guide 55. Each of the four columns 54 is mounted by means of a column nut 63 in the mold backing plate 53 on the nozzle end in such a way that a rotational motion of the column axle yields a longitudinal displacement of mold half 12. In order for the column axle 56 not to become soiled due to generous lubrication of the high precision thread for the lowest possible friction, the column axle 56 is surrounded by a protective sleeve 57. The rotational motion of the column axles 56 is produced centrally by a toothed belt drive 58 and a drive motor or electric motor 40. The mold backing plate 53 on the nozzle end is guided with almost no play on both sides by means of friction blocks 62 for an accurate parallel guidance. Cam 21 is mounted freely so that the crank movement of crank mechanism 18 can be converted into a linear motion without being hindered. Due to the movement of the mold backing plate 53 on the nozzle end by means of an appropriate rotational pulse on electric motor 42, the mold is opened widely, e.g., to a free clearance of 300 mm. The corresponding movement is indicated with arrow 64. Dt on the mold 12 indicates a thickness tolerance, e.g., due to changes in temperature of the molded body as a whole. If a correction is therefore necessary, it is detected automatically by the controller (change in closing force) and the position correction is implemented by the electric motor 40. The actual short stroke KH is executed merely by the cam movement over crank mechanism 19 and the obligatory horizontal linear motion of the movable mold backing plate 61. Another central function in production is removing the CD from the mold. FIG. 6b shows a CD removing robot 70 with a robot arm 71, a suction holding head 72 and a CD 73 held on it. The CD removing robot 70 has its own drive motor 74 and is fixedly connected to the machine bed as a removing unit 75. Complete coordination of the movement sequence of robot arm 71 and the short-stroke motion for opening the mold is important here. This coordination is in the millisecond range and is ensured through the use of suitable sensors, so there is no collision of moving parts under any circumstance.

Figure 7:
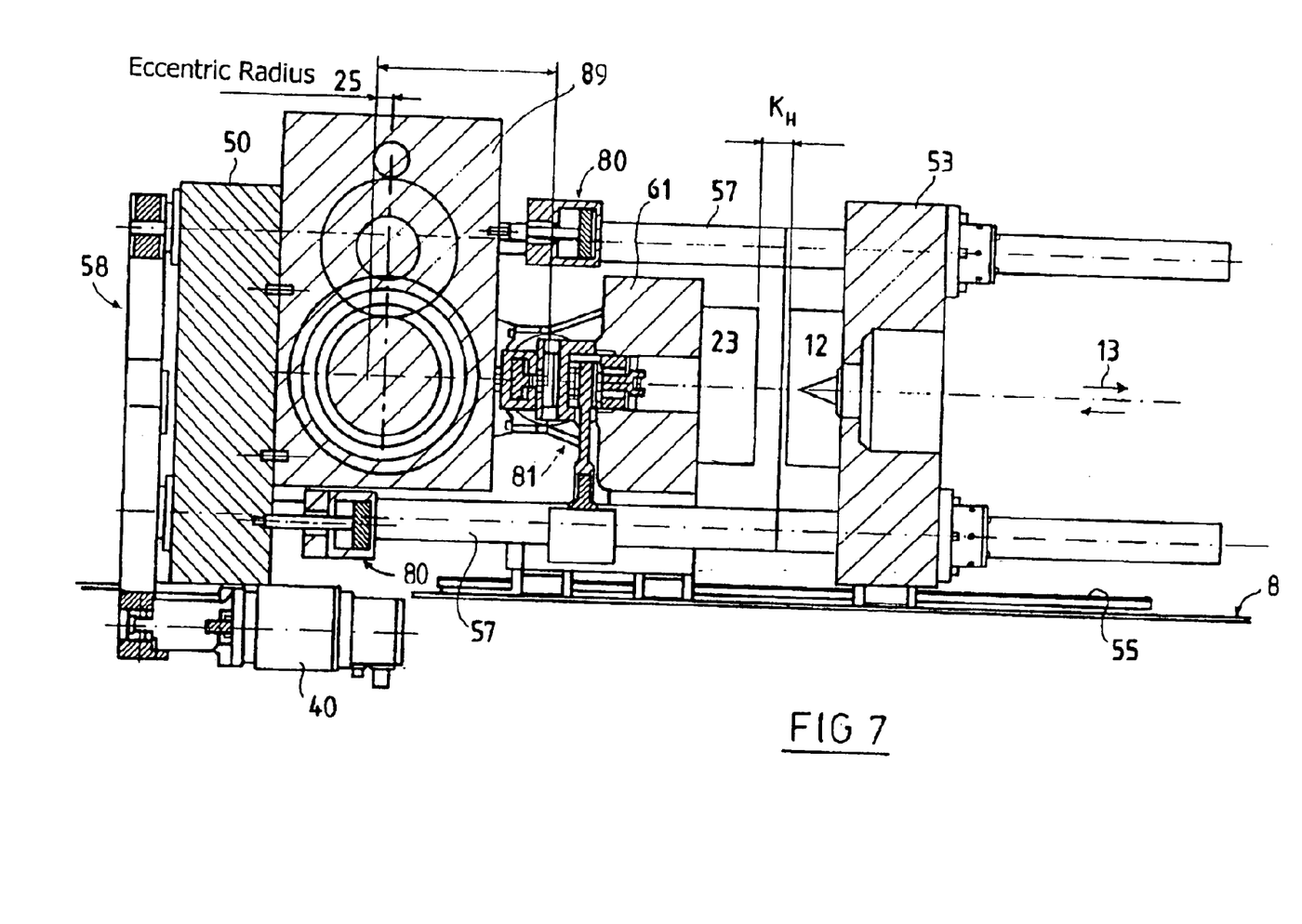
FIG. 7 a section VII—VII from FIG. 6b.

FIG. 7 shows a section VII—VII in FIG. 6b. As explained above, the central column-type nut drive is preferably a final controlling element of the closing force control, which is used together with a force sensor as an actual value generator to detect the closing force, and a control device. The displacement measurement of the stroke movements takes place by means of a displacement measurement in the servo motor itself. The reproducible positions are used as the basis of the control/regulation and coordination of the various axles. To be able to guarantee the required accuracy after an adjustment of the servicing stroke, the bearing play and thread play required from a mechanical engineering standpoint are eliminated by a bias stress device 80 in each of the driven columns. The required pressure to eliminate this play can be applied by means of springs or pneumatically, causing the play on the friction-engaged blank to be eliminated by means of a bias force between the support plate 15 and the mold plate 11. With cam 25, the cam radius is given as 25 mm only as an example, which would explain a total short stroke KH of 50 mm. The ejector device 81 will not be discussed in greater detail here. It may be designed with pneumatic operation, for example, and it may conform to the designs known in the state of the art.

Figure 8A:
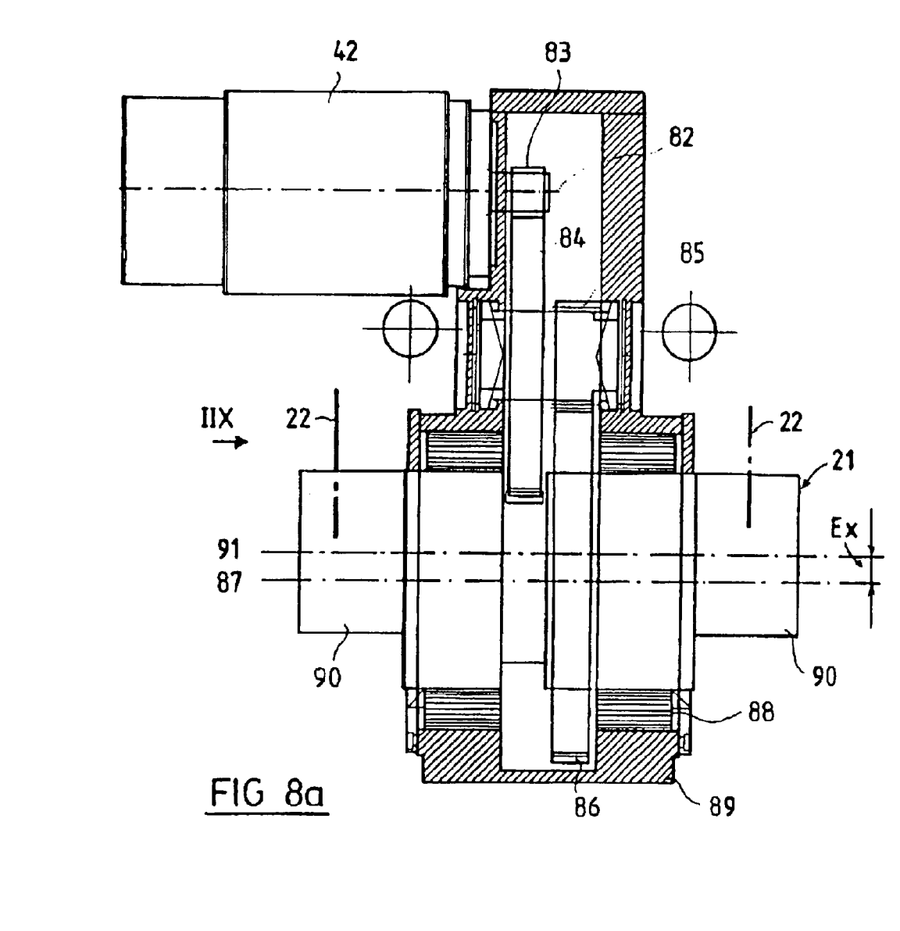
FIG. 8a a crank mechanism shown in a schematic diagram.
Figure 8B:
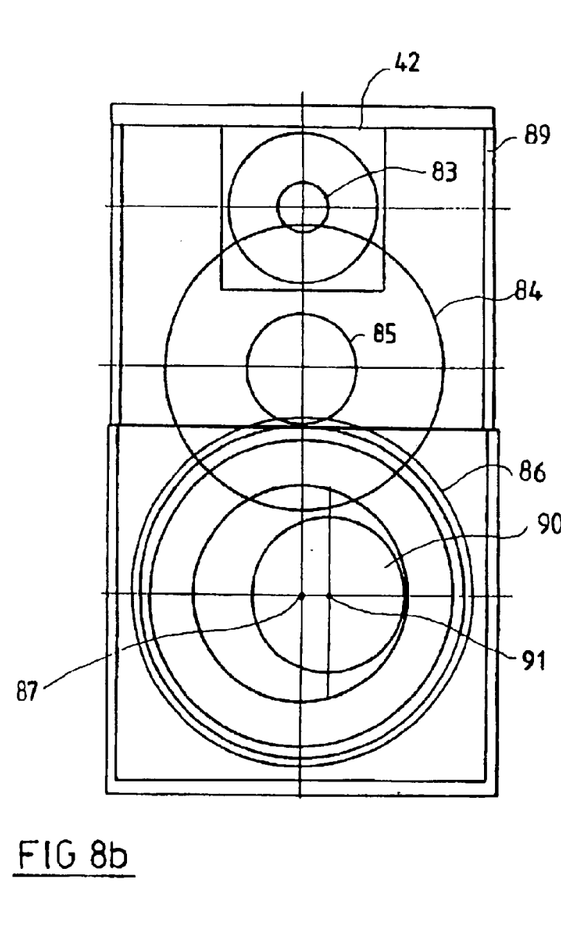

FIGS. 8a and 8b show schematically the cam drive. The electric motor as servo motor 42 is arranged at the top, transmitting with its output shaft 82 and a pinion 83 the motion of the rotor from the servo motor 42 to an overdrive gear wheel 84 and by another pinion 85 to the driving gear wheel 86, which is fixedly mounted on the cam shaft 21. Cam shaft 21 is positively driven about the axle 87 of the driving gear wheel 86. The eccentric cam 21 is (driven) by the two roller bearings 88 in the bearing block 89. One bearing pin 90 with a rotational axle 91 projects on each side. The two crank arms 22 are mounted on the bearing pin 90 (FIG. 9) and generate a crank motion for the movable mold backing plate in accordance with the eccentricity Ex.

Figure 9:
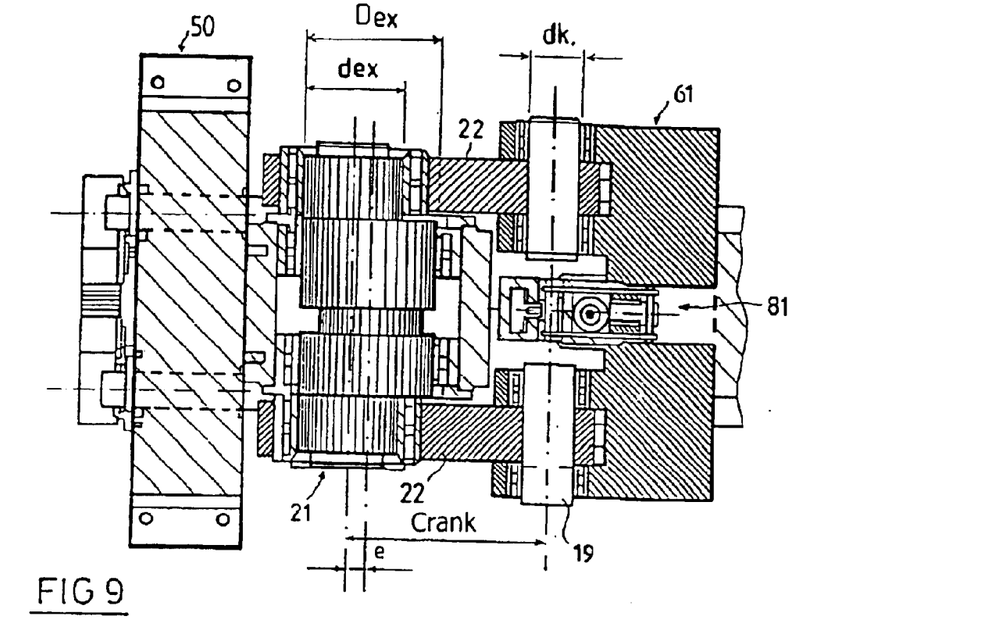

FIG. 9 shows in somewhat greater detail a horizontal section IX—IX from FIG. 6a. It can be seen here that cam 21 is freely mounted with respect to the drive carrier plate 50. The crank 22 is designed in duplicate, allowing a clearance between them for the entire ejector mechanism 81. It transmits the closing force uniformly, i.e., symmetrically, to the movable mold backing plate 61.

Figure 10:
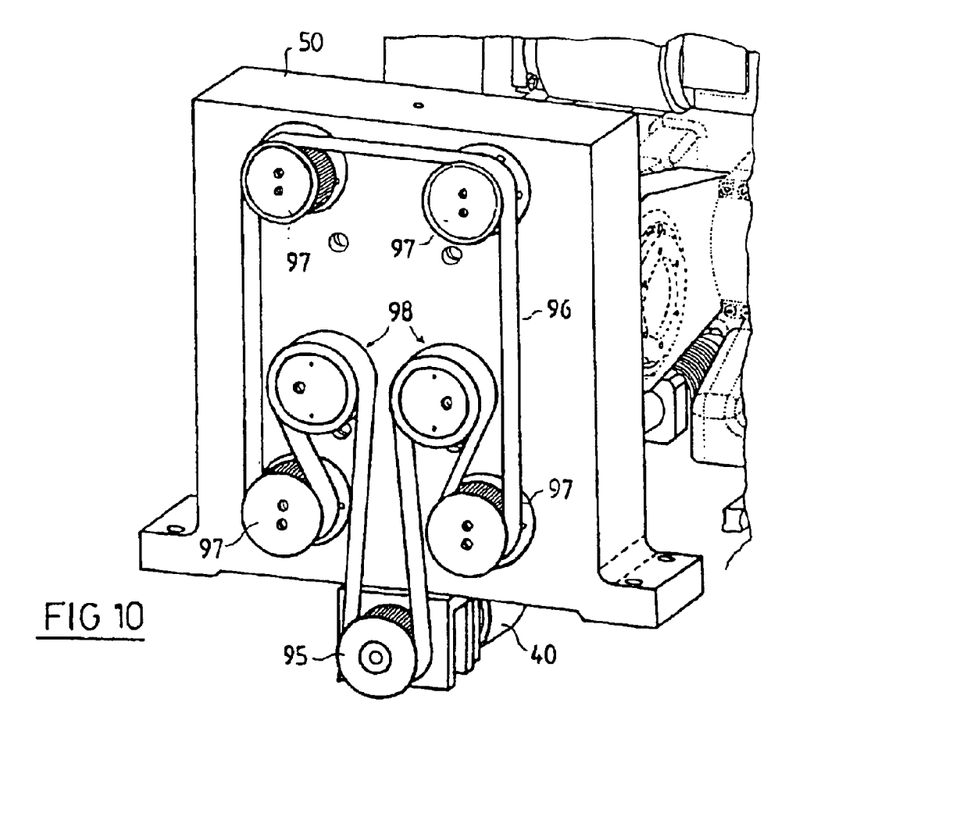
FIG. 10 an example of a central drive of the columns by a V-belt.

FIGS. 8, 9 and 10 each show an especially advantageous embodiment of the overdrive means. The term overdrive as used here is understood to refer to the technical gear means provided between the drive motor and the working parts to be given. A wide variety of means and transmission ratios can be used for the overdrive to optimize the drive technology. The embodiments illustrated here are only examples FIG. 10 shows a detail of a perspective view o the outer drive end of the drive carrier plate 50 for the central column nut adjustment. It is driven by an electric motor or servo motor 40 on which a toothed belt wheel 95 is arranged with tie toothed belt 96 running around it. The toothed belt 96 passes over the four belt overdrive wheels 97 as well as two bell tension wheels 98. This guarantees a precise drive of the four columns without any play.

Figure 11:
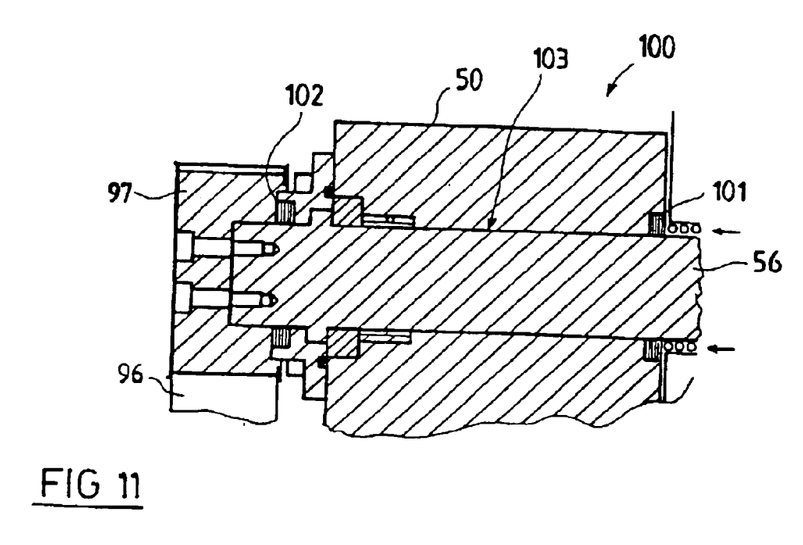
FIG. 11 the mounting of a column.

FIG. 11 shows a section through a bearing journal 100 on the column axle 56. A gasket 101 or 102 is provided on the two outer sides This makes it possible to enclose grease lubrication in the interior of the bearing, so that here again, the requirement of a long lifetime and clean room use is guaranteed.

Figure 12:
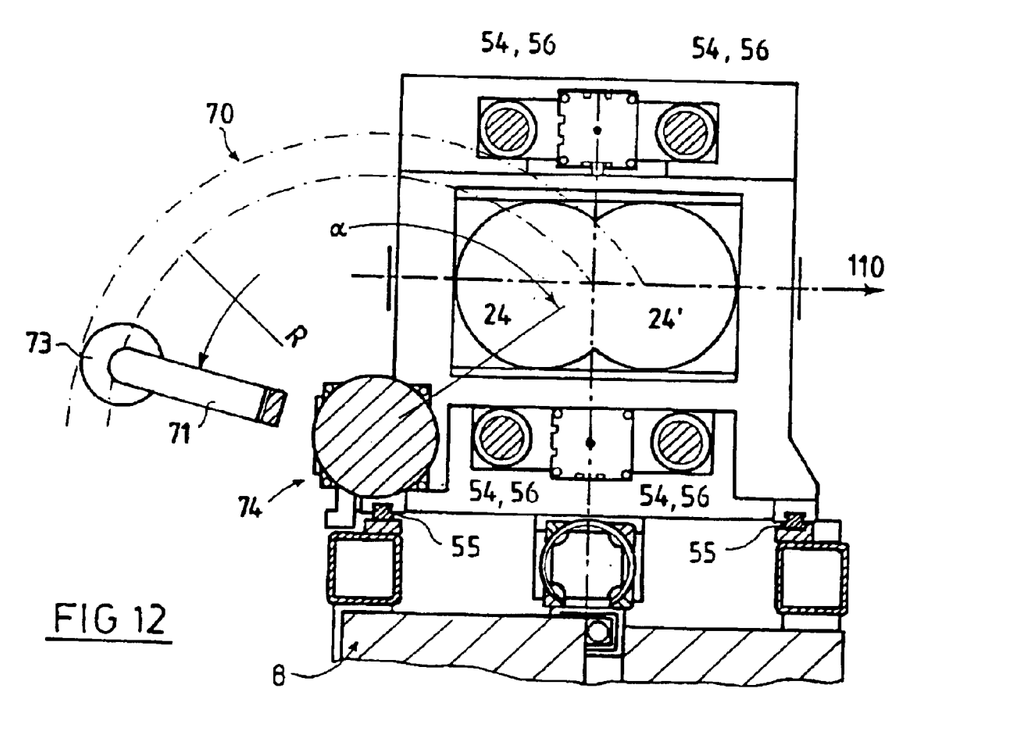
FIG. 12 an example of a mold having two cavities.

FIG. 12 shows in simplified form a dual cavity mold with two cavities 24, 24' accordingly for simultaneous production of the CDs. Through an appropriate design of the removal robot with a radius R, two or even more cavities may be provided, and CDs may optionally be removed on both sides (arrow 110). The angle of rotation depends on the specific relationships in each case.

What is claimed is:

1. A mold closing unit for an injection molding machine, comprising:
   a mold backing plate configured to be disposed proximate a nozzle of the injection molding machine; and
   a drive carrier plate associated with at least one electric motor servo axle,
   wherein the drive carrier plate and the mold backing plate are configured so as to remain in a stationary position relative to one another during a first stroke of a molding cycle, and move relative to one another during a second stroke of the molding cycle,
   wherein the drive carrier plate and the mold backing plate are configured to move relative to each other via the at least one electro motor servo axle, and
   wherein the second stroke is longer than the first stroke.

2. The mold closing unit of claim 1, further comprising an electric motor crank mechanism for producing the first stroke.

3. The mold closing unit of claim 2, further comprising a second mold backing plate that is movable, wherein the electric motor crank mechanism comprises a servo motor for moving the second mold backing plate between a closed position and an open position during the first stroke.

4. The mold closing unit of claim 3, wherein the crank mechanism comprises a cam shaft and two crank levers arranged in parallel.

5. The mold closing unit of claim 4, wherein the crank levers are configured to be driven and to act symmetrically on the second mold backing plate.

6. The mold closing unit of claim 5, wherein the crank levers are configured to be driven synchronously or asynchronously.

7. The mold closing unit of claim 3, wherein the crank mechanism is approximately in a dead center position when the second mold backing plate is in the closed position and is outside the dead center position when the second mold backing plate is in the open position.

8. The mold closing unit of claim 3, wherein the crank mechanism has a fixedly predetermined optimum crank position associated with the closed position of the second mold backing plate and various mold thicknesses can be set via position corrections of the second mold backing plate.

9. The mold closing unit of claim 1, further comprising an electric motor screw-nut drive configured to cause relative motion between the mold backing plate and the drive carrier plate during the second stroke.

10. The mold closing unit of claim 9, wherein the motor screw nut drive comprises a plurality of driven screws engaged with nuts configured to move the mold backing plate.

11. The mold closing unit of claim 10, further comprising a bias stress device associated with each of the plurality of screws, the bias stress devices being configured to prevent axial play.

12. The mold closing unit of claim 10, further comprising one of a toothed belt drive and a gear for rotatably driving the plurality of screws.

13. The mold closing unit of claim 10, further comprising at least one lubricated roller bearing for bearing the plurality of screws.

14. The mold closing unit of claim 1, further comprising a control system for sensing and controlling a closing force of the mold and the displacements associated with the strokes.

15. The mold closing unit of claim 14, further comprising a central screw-nut drive configured to control the closing force.

16. The mold closing unit of claim 15, further comprising a servo motor for measuring displacements associated with strokes, wherein the movements are used as reproducible positions for controlling screw axles of the screw-nut drive.

17. The mold closing unit of claim 1, further comprising at least one independently controllable drive motor for the first stroke and at least another independently controllable drive motor for the second stroke, wherein a controller is configured to provide a central adjustment for the first stroke and the second stroke.

18. The mold closing unit of claim 1, further comprising a control unit for coordinated, controlled movement of servo axles associated with creating the first and second strokes, the servo axles being associated with one of synchronous and asynchronous motors with corresponding servo boosters.

19. The mold closing unit of claim 1, further comprising an electromechanical drive motor for creating the first stroke.

20. The mold closing unit of claim 2, further comprising an electric motor screw-nut drive configured to cause relative motion between the mold backing plate and the drive carrier plate during the second stroke, wherein a direction of impact of the crank mechanism is arranged at least approximately in axial symmetry with screw axles of the screw-nut drive.

21. The mold closing unit of claim 1, further comprising a second mold backing plate that is movable.

22. The mold closing unit of claim 21, wherein the second mold backing plate and the mold backing plate are configured to engage a common guide rail of the injection molding machine.

23. The mold closing unit of claim 9, wherein the screw-nut drive comprises at least three screws arranged proximate the periphery of the drive carrier plate.

24. The mold closing unit of claim 23, further comprising an overdrive and crank mechanism for creating the first stroke, the overdrive for the crank mechanism being disposed proximate an interior portion of the drive carrier plate.

25. The mold closing unit of claim 1, further comprising a second mold backing plate and a screw-nut drive having a central axle drive for moving the mold backing plates relative to each other during the second stroke.

26. The mold closing unit of claim 1, wherein the injection molding machine comprises a mold removal device and a controller for controlling a synchronous operation of the removal device and the first stroke.

27. The mold closing unit of claim 1, wherein the drive carrier plate is configured to be fixedly mounted on a base of the injection molding machine.

28. The mold closing unit of claim 1, wherein the drive carrier plate is configured to remain stationary during the first stroke and the second stroke.

* * * * *

UNITED STATES PATENT AND TRADEMARK OFFICE
CERTIFICATE OF CORRECTION

PATENT NO. : 6,796,783 B1
DATED : September 28, 2004
INVENTOR(S) : Weinmann et al.

It is certified that error appears in the above-identified patent and that said Letters Patent is hereby corrected as shown below:

Title page,
Item [73], Assignee, "Netsal Maschinen AG" should read -- Netstal Maschinen AG --.

Signed and Sealed this

Seventh Day of December, 2004

JON W. DUDAS
*Director of the United States Patent and Trademark Office*